(12) United States Patent
Kajita et al.

(10) Patent No.: US 8,333,345 B2
(45) Date of Patent: Dec. 18, 2012

(54) COMPOSITE AIRCRAFT JOINT

(75) Inventors: Kirk Ben Kajita, Newcastle, WA (US); Douglas Allen Frisch, Renton, WA (US)

(73) Assignee: The Boeing Company, Chicago, IL (US)

( * ) Notice: Subject to any disclaimer, the term of this patent is extended or adjusted under 35 U.S.C. 154(b) by 144 days.

(21) Appl. No.: 12/868,886

(22) Filed: Aug. 26, 2010

(65) Prior Publication Data

US 2012/0049000 A1 Mar. 1, 2012

(51) Int. Cl.
*B64C 3/20* (2006.01)
*B64C 1/26* (2006.01)

(52) U.S. Cl. ............. 244/123.1; 244/124; 244/131

(58) Field of Classification Search .......... 244/119, 244/123.1, 123.13, 123.3, 123.8, 124, 131, 244/132; 428/57, 60, 61; 403/408.1; 416/229 R, 416/229 A
See application file for complete search history.

(56) References Cited

U.S. PATENT DOCUMENTS

| | | | | |
|---|---|---|---|---|
| 2,696,451 | A * | 12/1954 | Snyder | 428/83 |
| 4,120,998 | A * | 10/1978 | Olez | 428/33 |
| 4,228,976 | A * | 10/1980 | Eiselbrecher et al. | 244/131 |
| 4,344,995 | A * | 8/1982 | Hammer | 428/61 |
| 4,599,255 | A * | 7/1986 | Anglin et al. | 428/73 |
| 4,935,291 | A | 6/1990 | Gunnink | |
| 5,288,109 | A * | 2/1994 | Auberon et al. | 285/222.4 |
| 6,114,050 | A * | 9/2000 | Westre et al. | 428/608 |
| 7,115,323 | B2 * | 10/2006 | Westre et al. | 428/593 |
| 7,195,418 | B2 * | 3/2007 | Durand et al. | 403/408.1 |
| 7,491,289 | B2 | 2/2009 | Westre et al. | |
| 7,575,194 | B2 * | 8/2009 | Brown et al. | 244/123.1 |
| 7,810,756 | B2 * | 10/2010 | Alby et al. | 244/119 |
| 7,837,148 | B2 * | 11/2010 | Kismarton et al. | 244/123.1 |
| 7,909,290 | B2 * | 3/2011 | Cooper | 244/132 |
| 8,084,114 | B2 * | 12/2011 | Grose et al. | 428/73 |
| 2004/0055248 | A1 * | 3/2004 | Grillos | 52/783.1 |
| 2006/0159887 | A1 | 7/2006 | Rajabali et al. | |
| 2006/0283133 | A1 | 12/2006 | Westre et al. | |
| 2007/0000596 | A1 | 1/2007 | Westre et al. | |
| 2008/0078864 | A1 * | 4/2008 | Wilkerson et al. | 244/1 A |
| 2009/0151852 | A1 | 6/2009 | Roebroeks | |

FOREIGN PATENT DOCUMENTS

WO 2012027040 3/2012

OTHER PUBLICATIONS

Messler R. Joining of Materials and Structures : From Pragmatic Process to Enabling Technology [e-book]. Elsevier; 2004. Available from: eBook Collection (EBSCOhost), Ipswich, MA. pp. 647-667, 724-729. Accessed Aug. 1, 2012.*
PCT Search report dated Oct. 20, 2011 regarding International application No. PCT/US2010/044889.
PCT Search Report and Written Opinion dated Oct. 20, 2011 regarding international application No. PCT/US2011/044889, applicant The Boeing Company, 9 pages.
Preliminary Amendment dated Jul. 27, 2012 regarding U.S. Appl. No. 13/560,568, 7 pages.
Kajita et al., "Composite Aircraft Joint", U.S. Appl. No. 13/560,568, filed Jul. 27, 2012, 35 pages.

* cited by examiner

*Primary Examiner* — Tien Dinh
*Assistant Examiner* — Michael Kreiner
(74) *Attorney, Agent, or Firm* — Yee & Associates, P.C.

(57) ABSTRACT

A method and apparatus comprises a first number of layers of a composite material for a wing, a second number of layers of the composite material for the wing, and a metal layer located between the first number of layers and the second number of layers in the wing. The metal layer has a first thickness at a first area configured to receive a number of fasteners and a second thickness at a second area.

11 Claims, 6 Drawing Sheets

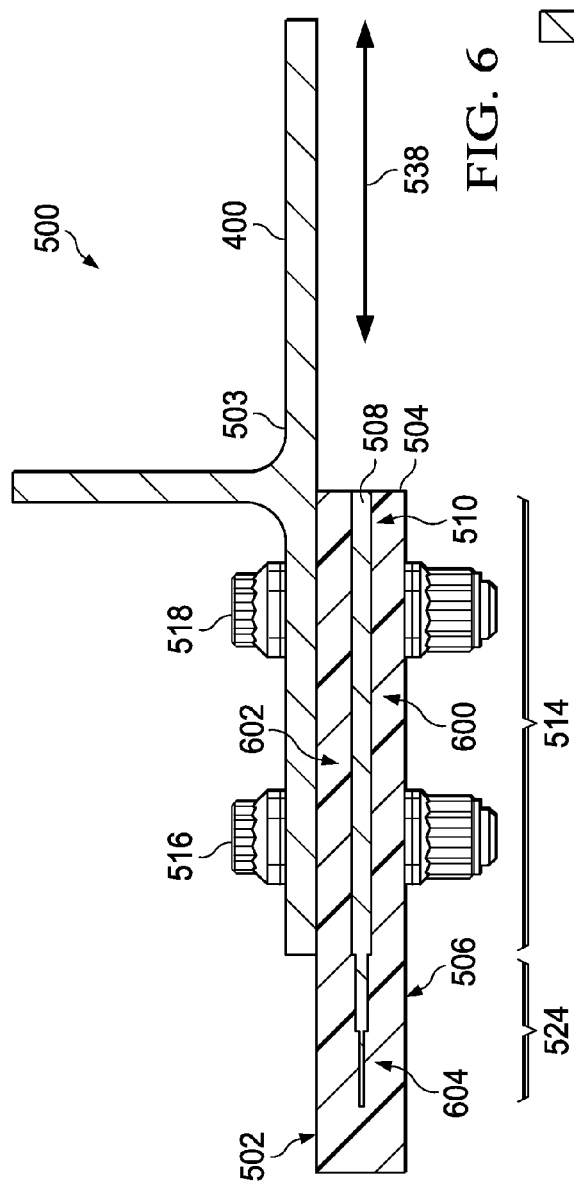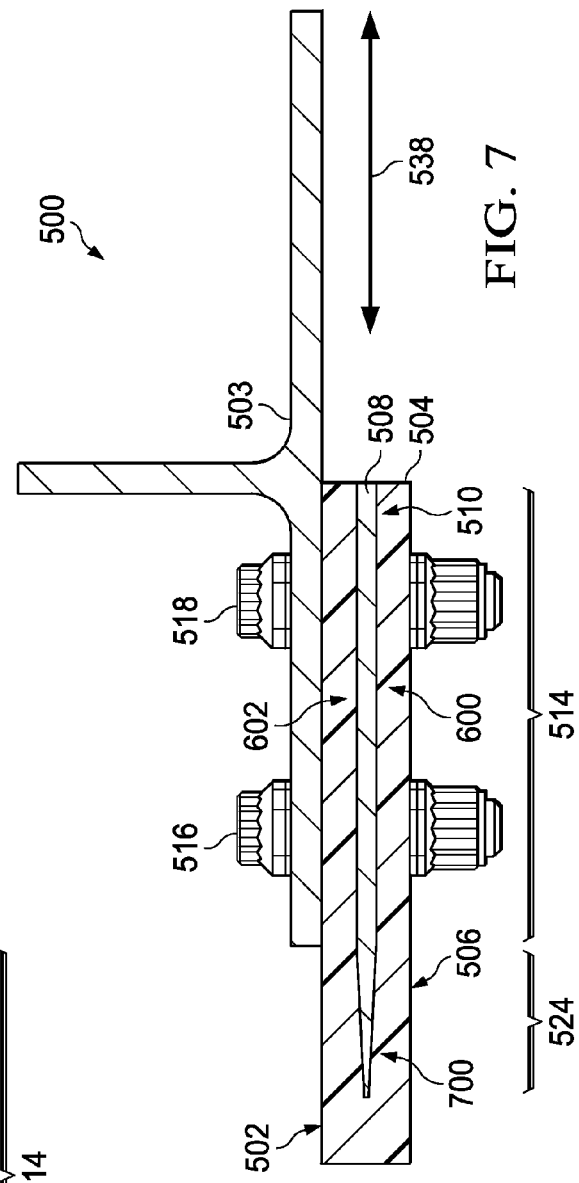

COMPOSITE AIRCRAFT JOINT

BACKGROUND INFORMATION

1. Field

The present disclosure relates generally to aircraft and, in particular, to structures in aircraft. Still more particularly, the present disclosure relates to a composite joint in an aircraft.

2. Background

Aircraft are being designed and manufactured with greater and greater percentages of composite materials. Some aircraft may have more than 50 percent of their primary structure made from composite materials. Composite materials are used in an aircraft to decrease the weight of the aircraft. This decreased weight improves performance features, such as, for example, without limitation, payload capacities and fuel efficiencies. Further, composite materials provide longer service life for various components in an aircraft.

Composite materials are tough, light-weight materials, created by combining two or more dissimilar components. For example, a composite material may include fibers and resins. The fibers may be in the form of a substrate or matrix. For example, the fibers may take the form of a woven cloth. The resin may form a reinforcement for the substrate. The fibers and resins are combined and cured to form the composite material.

Further, by using composite materials, portions of an aircraft may be created in larger pieces or sections. For example, a fuselage in an aircraft may be created in cylindrical sections that may be put together to form the fuselage of the aircraft. Other examples of sections that may be put together to form portions of an aircraft include, without limitation, wing sections joined to form a wing, and stabilizer sections joined to form a stabilizer.

In locations where joints are formed using composite materials, some joints may be required to carry higher loads than other joints. For example, joints formed by attaching a wing to a fuselage are examples of joints that are required to carry higher loads.

Composite materials typically have a lower strength when joints are formed by joining composite structures to each other using fasteners. As a result, the composite materials at these types of joints are typically thicker than at other locations. With thicker structures, the size and weight of the fasteners may increase to meet requirements for forming the joint.

The increase in thickness in the composite materials may be undesirable throughout the entire structure. For example, with a skin panel made of composite materials, increasing the thickness of the entire skin panel to allow for a desired thickness for a joint with a fuselage may be undesirable. The increased thickness of the entire skin panel may increase the weight of the aircraft and/or may reduce performance.

Therefore, it would be advantageous to have a method and apparatus that takes into account at least some of the issues discussed above, as well as possibly other issues.

SUMMARY

In one advantageous embodiment, an apparatus comprises a first number of layers of a composite material for a wing, a second number of layers of the composite material for the wing, and a metal layer located between the first number of layers and the second number of layers in the wing. The metal layer has a first thickness at a first area configured to receive a number of fasteners and a second thickness at a second area.

In another advantageous embodiment, an apparatus comprises a number of layers of composite material for a first structure, and a metal layer bonded to the number of layers of composite material as part of the first structure. The number of layers of composite material extends to an edge of the first structure configured to be attached to a second structure. The metal layer has a first thickness at a first area configured to receive a number of fasteners in the first area. The metal layer has a second thickness at a second area.

In yet another advantageous embodiment, a method is provided for manufacturing a wing of an aircraft. A first number of layers of a composite material for the wing are laid up. A metal layer is placed on the first number of layers of the composite material. The metal layer has a first thickness at a first area configured to receive a number of fasteners and a second thickness at a second area. A first layer of adhesive material is on a first side of the metal layer. A second layer of the adhesive material is on a second side of the metal layer. A second number of layers of the composite material for the wing are laid up on top of the metal layer. The first number of layers of the composite material, the metal layer, and the second number of layers of the composite material are bonded together.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 6 is an illustration of a cross-sectional view of a portion of a joint in accordance with an advantageous embodiment;

FIG. 7 is an illustration of a cross-sectional view of a portion of a joint in accordance with an advantageous embodiment;

DETAILED DESCRIPTION

Figure 1:
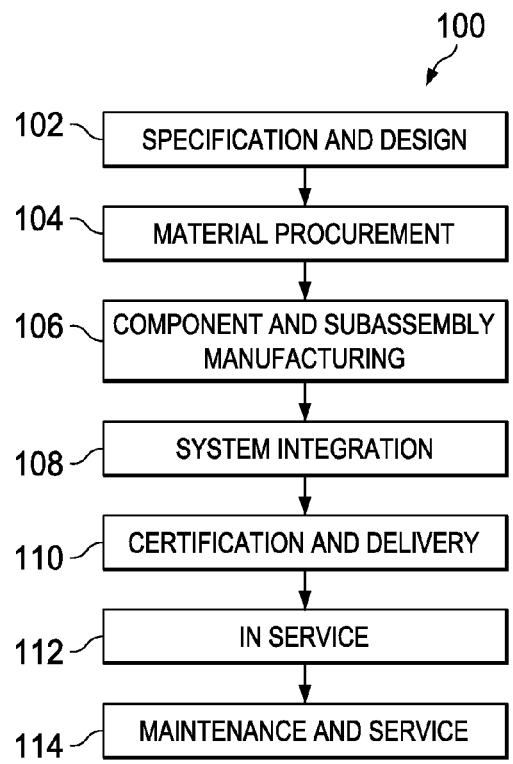
FIG. 1 is an illustration of an aircraft manufacturing and service method in accordance with an advantageous embodiment.
Figure 2:
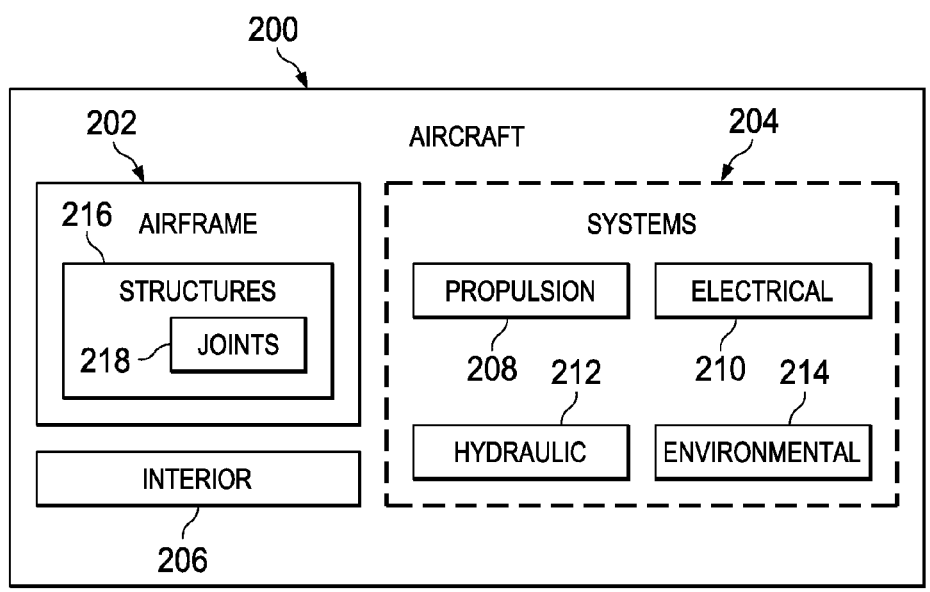
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included.

In these illustrative examples, airframe 202 may be formed from structures 216. Structures 216 may be joined together with joints 218. In these illustrative examples, structures 216 may include, for example, without limitation, skin panels, wing boxes, stabilizers, spars, ribs, and other suitable types of structures for airframe 202. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1.

As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments are one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

The different advantageous embodiments recognize and take into account a number of different considerations. For example, the different advantageous embodiments recognize and take into account that although thicker composite materials may be used at the locations of joints, these thicker joints may cause changes in the expected load and may result in forces that require the use of larger diameter fasteners, stronger fasteners, heavier fasteners, and/or other types of fasteners.

For example, as the thickness of the joint increases, the length of the fastener used for the joint also may increase. Further, at some point, the increased length of the fastener may require a thicker fastener to avoid bending of the fastener when loads are applied to the joint.

The different advantageous embodiments also recognize and take into account that the use of larger diameter fasteners often results in increased sizes in the joint parts. These increased sizes may be caused by an increased edge margin and fastener clearance requirements. An edge margin is the distance from the center of a fastener hole to the edge of the part. The edge margin is the distance required to prevent the fastener from pulling through the edge of the part under load conditions. The distance that is required increases with the diameter of the fastener which, in turn, increases the size of the part. Further, in some cases, the joint may become impractical if insufficient room is present in the location for larger fasteners or larger parts.

The different advantageous embodiments recognize and take into account that this situation may result in the use of heavier materials that meet the thickness or size requirements for the joints. For example, metal may be used for a joint. The use of metal, however, may preclude the use of composite materials in the remaining area of the part. For example, the use of metal in a skin panel may preclude the use of composite materials in the remaining portion of the skin panel. As a result, the aircraft may become heavier than desired.

Thus, the different advantageous embodiments provide an apparatus comprising a number of layers of composite material for a first structure and a metal layer bonded to the number of layers of composite material. The number of layers of composite material extends to an edge of the first structure configured to be attached to a second structure. The metal layer has a first thickness at a first area configured to receive a number of fasteners in the first area. The metal layer has a second thickness at a second area.

Figure 3:
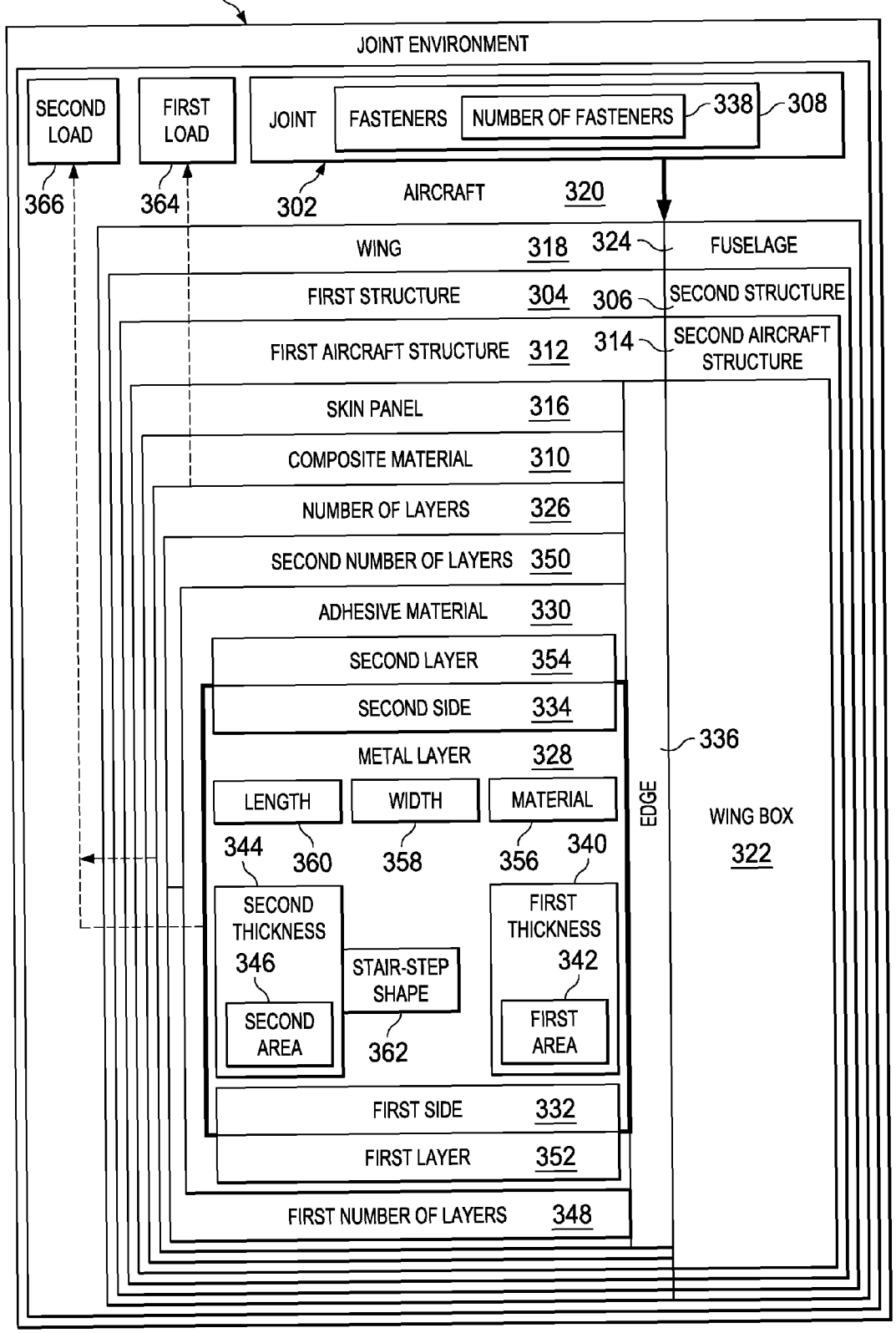
FIG. 3 is an illustration of a joint environment in accordance with an advantageous embodiment.

With reference now to FIG. 3, an illustration of a joint environment is depicted in accordance with an advantageous embodiment. Joint environment 300 is an example of an environment that may be used to implement a joint for an aircraft, such as, for example, joints 218 for aircraft 200 in FIG. 2.

In this illustrative example, joint 302 may be formed between first structure 304 and second structure 306. Joint 302 is formed where first structure 304 and second structure 306 are connected to each other in these illustrative examples. As depicted, fasteners 308 are used to join first structure 304 and second structure 306 to each other to form joint 302.

In this illustrative example, first structure 304 is first aircraft structure 312, and second structure 306 is second aircraft structure 314. In particular, first aircraft structure 312 is skin panel 316 for wing 318 for aircraft 320. Further, second aircraft structure 314 is wing box 322 in fuselage 324 of aircraft 320.

Skin panel 316 comprises number of layers 326 of composite material 310 and metal layer 328. Metal layer 328 is attached to number of layers 326. More specifically, metal layer 328 is bonded to number of layers 326. In these examples, the bond may be a chemical bond formed using adhesive material 330.

In this illustrative example, metal layer 328 has first side 332 and second side 334. First side 332 is opposite to second side 334. In other words, first side 332 and second side 334 are substantially parallel to each other.

In these illustrative examples, number of layers 326 and metal layer 328 have edge 336. Edge 336 is configured to receive number of fasteners 338 in fasteners 308. Further, edge 336 is configured to be attached to second aircraft structure 314. For example, edge 336, in this example, is the edge of skin panel 316 and is configured to be attached to wing box 322 in fuselage 324.

In these depicted examples, metal layer 328 has first thickness 340 at first area 342. First area 342 is located substantially at edge 336. First area 342 is configured to receive number of fasteners 338.

Additionally, metal layer 328 has second thickness 344 at second area 346. Second area 346 is located away from edge 336 in these examples. Second area 346 is an area that is not configured to receive number of fasteners 338 in these examples.

Metal layer 328 and number of layers 326 may be arranged in a number of different ways. For example, number of layers 326 may comprise first number of layers 348 and second number of layers 350. First number of layers 348 may be located on first side 332 of metal layer 328, while second number of layers 350 may be located on second side 334 of metal layer 328.

In these illustrative examples, first number of layers 348 may be bonded to first side 332 of metal layer 328 using first layer 352 of adhesive material 330. Second number of layers 350 may be bonded to second side 334 of metal layer 328 using second layer 354 of adhesive material 330. In some illustrative examples, only first number of layers 348 may be present and located on first side 332 of metal layer 328.

In these illustrative examples, number of layers 326 of composite material 310 may be formed in any manner desired for constructing first aircraft structure 312. For example, different layers within number of layers 326 may have different angles or orientations with respect to other layers, depending on the particular implementation. Further, resin and other materials used in number of layers 326 also may vary, depending on the particular implantation.

In these illustrative examples, metal layer 328 is comprised of material 356. Material 356 may vary, depending on the particular implementation. For example, material 356 may be selected from one of titanium, steel, a metal alloy, and/or other suitable types of metal.

In these illustrative examples, metal layer 328 also has width 358 and length 360 in addition to first thickness 340 and second thickness 344. In these illustrative examples, first thickness 340 is greater in value than second thickness 344.

Metal layer 328 may transition from first thickness 340 to second thickness 344 in a number of different ways. For example, metal layer 328 may taper from first thickness 340 to second thickness 344. In other illustrative examples, metal layer 328 may change from first thickness 340 to second thickness 344 with a stair-step shape 362. Of course, other types of transitions may be selected, depending on the particular implementation.

In these illustrative examples, number of layers 326 in first aircraft structure 312 is configured to carry first load 364. Metal layer 328 and number of layers 326 of composite material 310 are configured to carry second load 366. First load 364 is less than second load 366 in these examples. First load 364 is substantially the maximum load expected to be carried by first aircraft structure 312 in joint 302 during use of the structures.

Second load 366 is selected to be greater than the maximum load. As a result, second load 366 provides a safety factor. For example, second load 366 may be about 150 percent of first load 364 in these examples. In this manner, if the load carried by first aircraft structure 312 is greater than first load 364, which is the maximum expected load, the possibility for a decreased amount of performance of joint 302 is reduced. In other words, joint 302 is configured to carry up to second load 366 such that the possibility for a decreased amount of performance of joint 302 is reduced.

The illustration of joint environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, metal layer 328 may have different sections along edge 336. In still other advantageous embodiments, an additional number of metal layers may be present in addition to metal layer 328. These other metal layers may be interspersed between other layers within number of layers 326 of composite material 310.

In still other illustrative examples, joint 302 may be used in other platforms other than aircraft 320. For example, joint 302 may be used in a platform selected from one of a mobile platform, a stationary platform, a land-based structure, an aquatic-based structure, a space-based structure, and/or some other suitable object. More specifically, the different advantageous embodiments may be applied to, for example, without limitation, a submarine, a bus, a personnel carrier, a tank, a train, an automobile, a spacecraft, a space station, a satellite, a surface ship, a power plant, a dam, a bridge, a manufacturing facility, a building, and/or some other suitable object.

As another example, metal layer 328 in first structure 304 may be replaced with another layer comprised of a type of material other than metal. The material may be selected to have a greater strength than the materials in first number of layers 348 and/or second number of layers 350. For example, the material used in place of metal in metal layer 328 may be, for example, without limitation, a number of layers of a composite material, ceramic, a plastic, and/or any other suitable materials. These other materials may have the variable thickness with a change from first thickness 340 to second thickness 344.

Further, although first thickness 340 in metal layer 328 is described as being at or near edge 336 and changes to second thickness 344 away from edge 336, first thickness in metal layer 328 may be located away from edge 336. For example, first thickness 340 may be located at any location where second structure 306 is attached to first structure 304. For example, first thickness 340 may be located midway or centrally in metal layer 328 in first structure 304. In one illustrative example, when first structure 304 is a panel, first thickness 340 may be in the middle of the panel where second structure 306, in the form of a monument, is to be mounted.

This configuration may be used to attach first structure 304 to second structure 306 where first thickness 340 is located. For example, first thickness 340 may be at any location where a number of fasteners are used to fasten first structure 304 to second structure 306. First structure 304 may be, for example, a panel, floor, wall, or other suitable structure. Second structure 306 may be a monument, door, or some other suitable structure.

Figure 4:
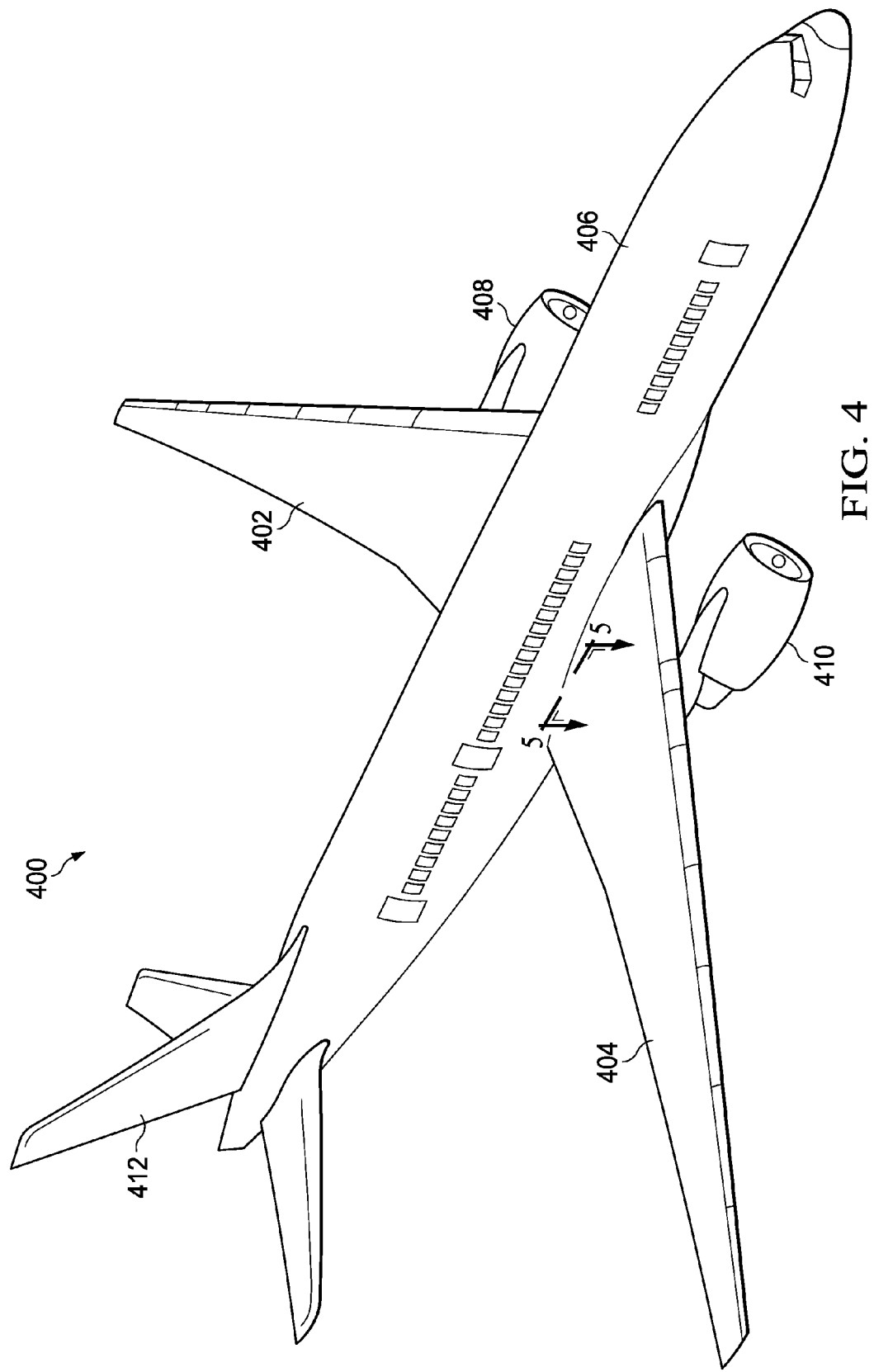
FIG. 4 is an illustration of an aircraft in accordance with an advantageous embodiment.

With reference now to FIG. 4, an illustration of an aircraft is depicted in accordance with an advantageous embodiment. Aircraft 400 is an example of one implementation for aircraft 200 in FIG. 2. Further, aircraft 400 is an aircraft in which joints 218 in FIG. 2, and, in particular, joint 302 in FIG. 3, may be formed. In this illustrative example, aircraft 400 has wings 402 and 404 attached to fuselage 406. Aircraft 400 includes wing-mounted engine 408, wing-mounted engine 410, and tail 412.

Figure 5:
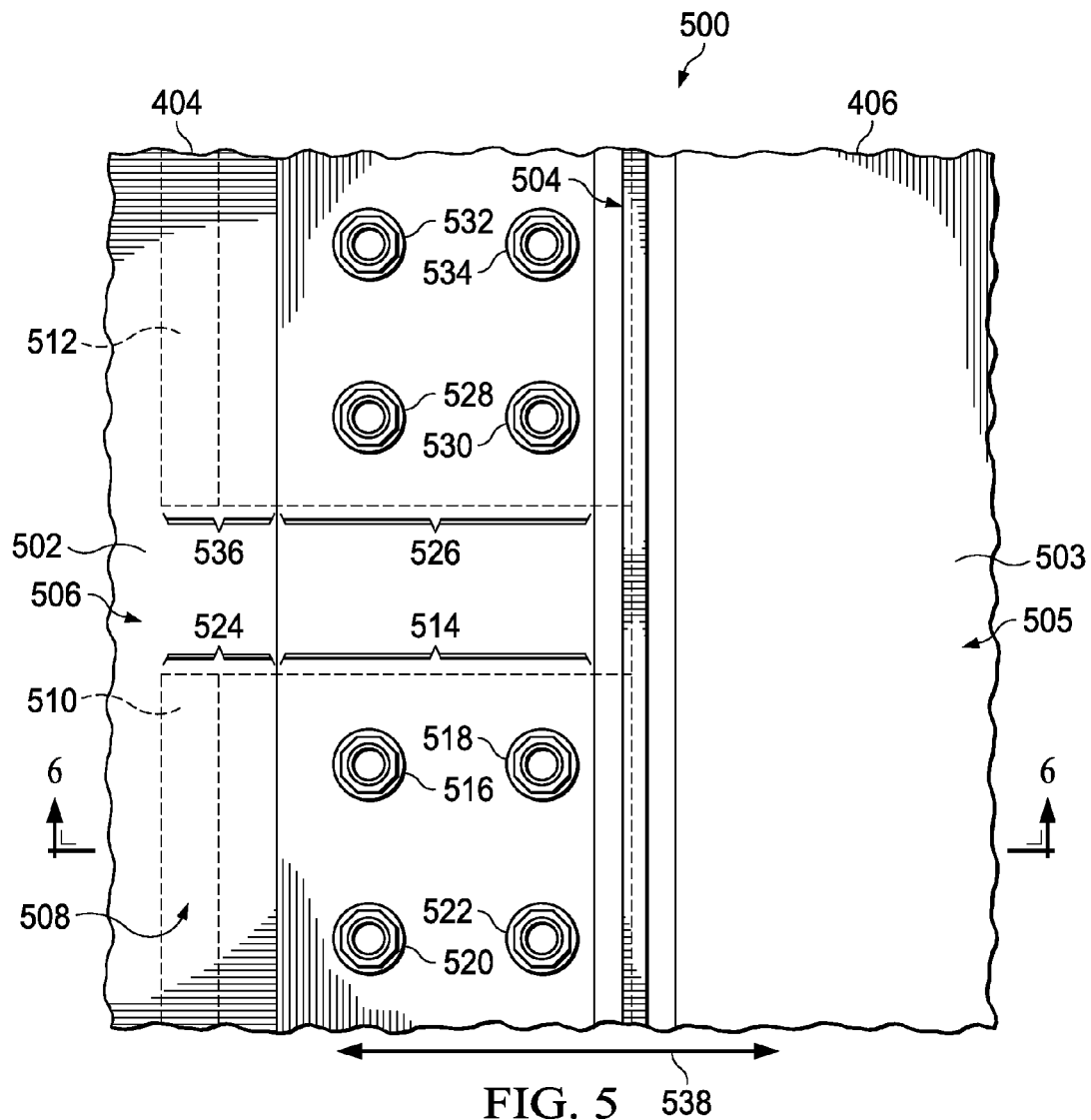
FIG. 5 is an illustration of an exposed cross-sectional phantom view of a portion of a joint formed between a wing and a fuselage of an aircraft in accordance with an advantageous embodiment.

With reference now to FIG. 5, an illustration of an exposed cross-sectional phantom view of a portion of a joint formed between a wing and a fuselage of an aircraft is depicted in accordance with an advantageous embodiment. In this illustrative example, an exposed cross-sectional phantom view of a portion of the joint formed by the attachment of wing 404 to fuselage 406 is depicted taken along lines 5-5 in FIG. 4.

As depicted, joint 500 is formed by the attachment of wing 404 to fuselage 406 in this example. In particular, skin panel 502 for wing 404 is connected to rib 503 of wing box 505 for fuselage 406 at edge 504 of skin panel 502. Skin panel 502 is comprised of composite materials in this illustrative example. Further, skin panel 502 is comprised of number of layers 506 of the composite material and metal layer 508.

In this illustrative example, metal layer 508 is comprised of titanium. Metal layer 508 includes piece 510 and piece 512 of titanium. As depicted, first area 514 of piece 510 of metal layer 508 is configured to receive fasteners 516, 518, 520, and 522. Second area 524 of piece 510 of metal layer 508 is not configured to receive fasteners in this example.

Further, first area 526 of piece 512 of metal layer 508 is configured to receive fasteners 528, 530, 532, and 534. Second area 536 of piece 512 of metal layer 508 is not configured to receive fasteners in this example. Fasteners 516, 518, 520, 522, 528, 530, 532, and 534 are installed in skin panel 502 to form joint 500.

In this depicted example, the configuration of number of layers 506 with metal layer 508 allows joint 500 to carry a higher load in a direction along axis 538 as compared to a configuration of number of layers 506 of composite material without metal layer 508.

With reference now to FIG. 6, an illustration of a cross-sectional view of a portion of a joint is depicted in accordance with an advantageous embodiment. In this illustrative example, a cross-sectional view of joint 500 in FIG. 5 is depicted taken along lines 6-6 in FIG. 5.

As illustrated in this example, skin panel 502 is attached to rib 503 for fuselage 406 in FIGS. 4 and 5. In this illustrative example, metal layer 508 is located between number of layers 506 of the composite material. In particular, metal layer 508 is located between first number of layers 600 of the composite material and second number of layers 602 of the composite material.

In this illustrative example, first area 514 of piece 510 of metal layer 508 has a first thickness configured to receive fastener 516 and fastener 518. Second area 524 of piece 510 of metal layer 508 has a second thickness not configured to receive the fasteners. The first thickness has a greater value than the second thickness. As depicted in this example, the first thickness in first area 514 changes to the second thickness in second area 524 with stair-step shape 604.

With reference now to FIG. 7, an illustration of a cross-sectional view of a portion of a joint is depicted in accordance with an advantageous embodiment. In this illustrative example, the cross-sectional view of joint 500 depicted in FIG. 6 is illustrated in FIG. 7 with second area 524 of piece 510 of metal layer 508 having tapered shape 700. As depicted, the first thickness of first area 514 tapers to the second thickness of second area 524 with tapered shape 700.

In these illustrative examples, the gradual reduction in thickness for piece 510 of metal layer 508 with tapered shape 700 in FIG. 7 and stair-step shape 604 in FIG. 6 may allow skin panel 502 to be manufactured more easily as compared to manufacturing piece 510 with the first thickness for first area 514 changing to the second thickness for second area 524 without this gradual reduction.

Additionally, the use of tapered shape 700 in FIG. 7 and stair-step shape 604 in FIG. 6 allows the load carried by metal layer 508 to gradually be transferred to number of layers 506 of the composite material.

Figure 8:
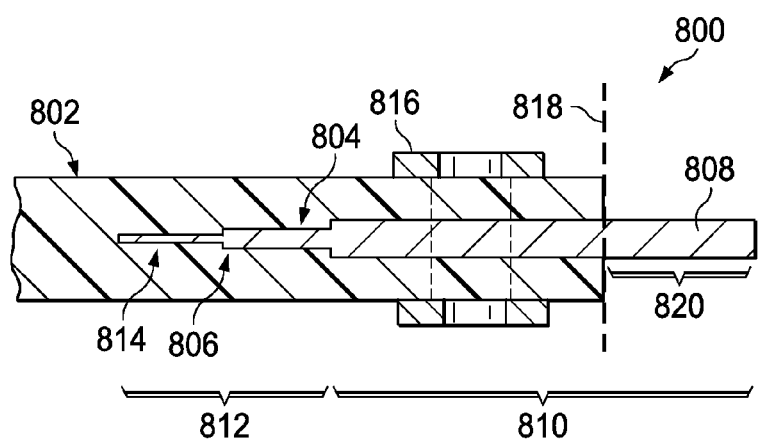
FIG. 8 is an illustration of a cross-sectional view of a structure in accordance with an advantageous embodiment.

With reference now to FIG. 8, an illustration of a cross-sectional view of a structure is depicted in accordance with an advantageous embodiment. In this illustrative example, structure 800 is skin panel 802. Skin panel 802 is comprised of first number of layers 804, second number of layers 806, and metal layer 808.

First number of layers 804 and second number of layers 806 are comprised of composite materials in this example. Metal layer 808 is comprised of titanium. As depicted, metal layer 808 has first area 810 and second area 812. First area 810 has a thickness with a greater value than the thickness for second area 812 and is configured to receive fastener 816. Further, the thickness for first area 810 changes to the thickness for second area 812 with stair-step shape 814 in this example.

As depicted, first number of layers 804 has edge 818. Metal layer 808 has tab 820 that extends beyond edge 818 in this illustrative example. Tab 820 may be used to test the load that can be carried by metal layer 808. In this manner, metal layer 808 can be tested to ensure that metal layer 808 can carry a selected load, while metal layer 808 is bonded to second number of layers 806. The selected load is a load less than the maximum load expected to occur for the lifetime of structure 800.

Figure 9:
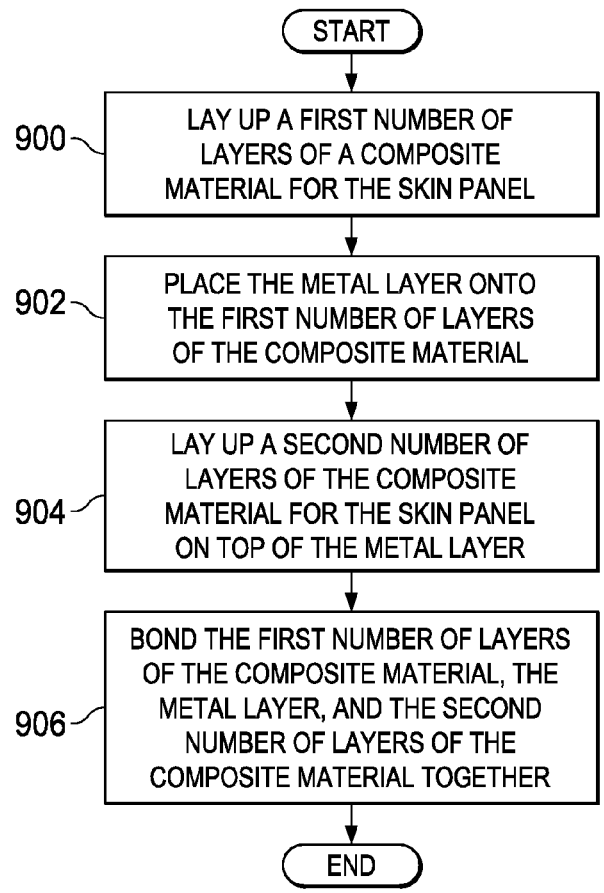
FIG. 9 is an illustration of a flowchart of a process for manufacturing a wing for an aircraft in accordance with an advantageous embodiment.

With reference now to FIG. 9, an illustration of a flowchart of a process for manufacturing a wing for an aircraft is depicted in accordance with an advantageous embodiment. The process illustrated in FIG. 9 may be implemented to manufacture, for example, wing 318 of aircraft 320 in FIG. 3. In particular, this process may be implemented to manufacture skin panel 316 for wing 318 of aircraft 320 in FIG. 3.

The process begins by laying up a first number of layers of a composite material for the skin panel (operation 900). In operation 900, the first number of layers of the composite material may be laid up onto a mold for the skin panel for the wing of the aircraft. Further, operation 900 may be performed using any currently available processing for laying up composite materials.

Next, the process places the metal layer onto the first number of layers of the composite material (operation 902). The metal layer has a first thickness at a first area at the edge of the wing and a second thickness at a second area. Further, the first thickness changes to the second thickness using one of a tapered shape and a stair-step shape. The first area of the edge of the wing is configured to receive a number of fasteners. The second area is not configured to receive the number of fasteners.

In this illustrative example, the metal layer has a first layer of adhesive material applied to a first side of the metal layer and a second layer of adhesive material applied to a second side of the metal layer. In operation 902, the metal layer is placed onto the first number of layers such that the first layer of adhesive material on the first side of the metal layer contacts the first number of layers of the composite material.

In other illustrative examples, the first layer of the adhesive material may be applied to the first number of layers of the composite material prior to performing operation 902. Further, the second layer of the adhesive material may be applied to the metal layer after performing operation 902 in some illustrative examples.

The process then lays up a second number of layers of the composite material for the skin panel on top of the metal layer (operation 904). In this illustrative example, in operation 904, the second layer of the adhesive material on the second side of the metal layer comes into contact with the second number of layers of the composite material.

Thereafter, the process bonds the first number of layers of the composite material, the metal layer, and the second number of layers of the composite material together (operation 906), with the process terminating thereafter. Operation 906 may be performed by curing the first number of layers of the composite material, the metal layer, and the second number of layers of the composite material together.

For example, the different layers may be cured by heating the layers in at least one of an oven, an autoclave, or some other suitable heating device. Of course, any currently available process for curing materials may be used to perform operation 906.

Figure 10:
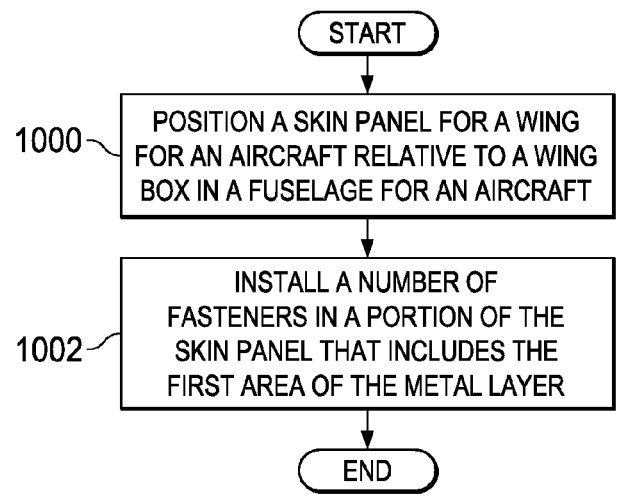
FIG. 10 is an illustration of a flowchart of a process for forming a joint in accordance with an advantageous embodiment.

With reference now to FIG. 10, an illustration of a flowchart of a process for forming a joint is depicted in accordance with an advantageous embodiment. The process illustrated in FIG. 10 may be implemented to form joint 302 between skin panel 316 and wing box 322 in FIG. 3.

The process begins by positioning a skin panel for a wing for an aircraft relative to a wing box in a fuselage for an aircraft (operation 1000). The skin panel is comprised of a number of layers of a composite material and a metal layer bonded to the number of layers of the composite material. The metal layer has a first thickness in a first area configured to receive a number of fasteners and a second thickness in a second area not configured to receive the number of fasteners.

The process then installs a number of fasteners in a portion of the skin panel that includes the first area of the metal layer (operation 1002), with the process terminating thereafter. In operation 1002, the installation of the number of fasteners forms the joint between the skin panel and the wing box.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

For example, in some illustrative examples, the bonding of the first number of layers of the composite material and the metal layer in operation 906 may be performed prior to the laying up of the second number of layers of composite material in operation 904. In these types of examples, bonding of the metal layer to the second number of layers of composite material is then performed separately after the second number of layers is laid up on top of the metal layer.

Thus, the different advantageous embodiments provide an apparatus comprising a number of layers of composite material for a first aircraft structure and a metal layer bonded to the number of layers of composite material. The metal layer and the number of layers of composite material have an edge configured to be attached to a second aircraft structure. The metal layer has a first thickness at a first area at the edge of the first aircraft structure and is configured to receive the number of fasteners in the first area. The metal layer has a second thickness at a second area that is not configured to receive the number of fasteners.

The different advantageous embodiments provide a method and apparatus for forming a joint between a first structure and a second structure in which the joint is formed by fasteners installed in the first structure. The joint has a capability to carry higher loads than a maximum load expected for the life of the first structure with the use of a number of layers of composite material and a metal layer bonded to and located between the number of layers of composite materials.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a first number of layers of a composite material forming an exterior of a skin of a wing;
    a second number of layers of the composite material forming an interior of the skin of the wing;
    a metal layer located between the first number of layers and the second number of layers in the wing, wherein the metal layer has a first thickness at a first area configured to receive a number of fasteners and a second thickness that is different from the first thickness at a second area, wherein the exterior is parallel to the interior from the first area to the second area.

2. The apparatus of claim 1, wherein the second area is configured to transfer loads carried by the metal layer to the first number of layers and the second number of layers in the second area.

3. The apparatus of claim 1, wherein the metal layer changes in thickness by at least one of tapering from the first thickness to the second thickness and changing from the first thickness to the second thickness with a stair-step shape.

4. The apparatus of claim 1, wherein the first number of layers, the second number of layers, and the metal layer extend to an edge of the wing configured to be attached to a fuselage of an aircraft in which the first area of the metal layer configured to receive the number of fasteners is at the edge of the wing.

5. The apparatus of claim 1, wherein a portion of the metal layer extends beyond an edge for the first number of layers and the second number of layers, wherein the portion of the metal layer is configured for use in testing the metal layer with a selected load that is less than a maximum load expected during flight of an aircraft.

6. The apparatus of claim 1, wherein the metal layer is comprised of a material selected from one of titanium, steel, and a metal alloy.

7. The apparatus of claim 1, wherein the first number of layers and the second number of layers are configured to carry a load up to a maximum load expected during flight of an aircraft.

8. The apparatus of claim 7, wherein the first number of layers, the second number of layers, and the metal layer are configured to carry a load greater than the maximum load expected during the flight of the aircraft.

9. The apparatus of claim 7, wherein the load extends in a direction along a plane through the metal layer.

10. The apparatus of claim 1, wherein the metal layer is bonded to the first number of layers and the second number of layers.

11. The apparatus of claim 1, wherein the metal layer has a first side and a second side opposite to the first side and further comprising:
   a first layer of adhesive located on the first side of the metal layer, wherein the first number of layers is on the first layer of adhesive; and
   a second layer of adhesive located on the second side of the metal layer, wherein the second number of layers is on the second layer of adhesive.

* * * * *